United States Patent [19]

Shaffer et al.

[11] 4,101,259
[45] Jul. 18, 1978

[54] MULTILAMP PHOTOFLASH ASSEMBLY WITH ROTATABLE ACTUATOR

[75] Inventors: John W. Shaffer; David W. Mecone; William T. Colville, all of Williamsport, Pa.

[73] Assignee: GTE Sylvania Incorporated, Stamford, Conn.

[21] Appl. No.: 740,279

[22] Filed: Nov. 9, 1976

[51] Int. Cl.² .................... F21K 5/02; G03B 15/02
[52] U.S. Cl. ........................................ 431/93; 362/11; 362/14
[58] Field of Search ............... 240/1.3; 354/142; 431/93, 95 R, 95 A; 362/11, 13, 14

[56] References Cited

U.S. PATENT DOCUMENTS

| 3,727,040 | 4/1973 | Armstrong et al. ............ 240/1.3 |
| 3,812,339 | 5/1974 | Broadt ......................... 240/1.3 |
| 3,980,421 | 9/1976 | Heeman et al. ............ 240/1.3 X |
| 4,059,387 | 11/1977 | Witterick et al. ............ 431/93 |

FOREIGN PATENT DOCUMENTS

| 2,420,607 | 11/1975 | Fed. Rep. of Germany ........ 240/1.3 |
| 2,438,992 | 3/1976 | Fed. Rep. of Germany ........ 240/1.3 |
| 2,444,128 | 3/1976 | Fed. Rep. of Germany ........ 240/1.3 |
| 2,614,272 | 4/1976 | Fed. Rep. of Germany ........ 240/1.3 |

Primary Examiner—Fred L. Braun
Attorney, Agent, or Firm—Lawrence R. Fraley

[57] ABSTRACT

A multilamp photoflash assembly comprising a housing defining two adjacent regions therein, a plurality of flashlamps within one of said regions having at least one pre-energized striking mechanism associated with each of said lamps, and a rotatable actuating member for sequentially actuating each of the striking mechanisms and thus cause firing of the lamps. In another embodiment, there is disclosed a photoflash assembly wherein a plurality of flashlamps are located within both of said regions and a single actuator is used. In still another embodiment, both regions of the support member are occupied with flashlamps and a pair of rotatable actuators are employed.

26 Claims, 8 Drawing Figures

MULTILAMP PHOTOFLASH ASSEMBLY WITH ROTATABLE ACTUATOR

CROSS REFERENCE TO COPENDING APPLICATION

Another application, Ser. No. 740,278, entitled "MULTILAMP PHOTOFLASH ASSEMBLY" (Inventors: L.F. Anderson et al.), was filed Nov. 9, 1976, and involves a multiple flashlamp assembly which employs a movable actuation means within the assembly's housing to trigger flashlamp-associated striking mechanisms in response to mechanical actuation inputs from the respective mounting structures of the housing.

BACKGROUND OF THE INVENTION

The present invention relates to photoflash assemblies and particularly to photoflash assemblies of the multilamp variety. More particularly, the invention relates to multilamp photoflash assemblies which employ percussively actuated flashlamps.

Basically, there are two types of multilamp photoflash assemblies available today for camera users. One is the electrically actuated variety and includes the earlier popular "flashcube," the more recently introduced linear arrays known as "flash bars," and the planar arrays better known as "flip-flash" assemblies. Examples of these units are illustrated in U.S. Pat. Nos. 3,327,105 (Kottler et al.), 3,598,984 (Slomski), and 3,937,946 (Weber), respectively. These patents describe photoflash units wherein the flashlamps utilized depend upon electrical energy for ignition. Usually the source of this energy is provided within the camera, typically in the form of dry cell batteries or piezoelectric elements. Although electrically energized flashlamp units provide a number of advantageous features, such devices also contain inherent disadvantages. Ignition failures represent the most critical of these and are usually the result of weak batteries, dirty or corroded electrical contacts, faulty switching mechanisms, etc.

The second type of multilamp photoflash assemblies well known today are those wherein the flashlamps depend upon mechanical actuation to provide ignition (or firing). Photoflash assemblies of this variety have proven to be highly reliable and typically utilize percussively-ignitable flashlamps, an example being disclosed in U.S. Pat. No. 3,535,063 (Anderson et al.), assigned to the assignee of the present invention. Percussively ignitable flashlamps include an hermetically sealed, light-transmitting envelope having therein a filamentary combustible material, e.g., zirconium foil, and a combustion-supporting atmosphere, e.g., oxygen. Such flashlamps also utilize a mechanically actuated primer (described in U.S. Pat. No. 3,535,063) which extends from the envelope and operates to fire the combustible material when impacted by a pre-energized striking mechanism such as described in U.S. Pat. No. 3,597,604 (Shaffer). U.S. Pat. No. 3,597,604 is also assigned to the assignee of the present invention. Percussively actuated flashlamps differ from electrically ignited lamps which do not use a primer-striker arrangement. Electrically fired lamps typically employ a pair of lead wires which are sealed within the lamp's envelope and protrude therefrom, said wires forming an electrical circuit with the above-described contacts, cells, and switches within the camera. A typical example is shown in U.S. Pat. No. 3,506,385/(Weber et al.). Once again, it is understood that electrically ignited flashlamps and photoflash assemblies possess several inherent disadvantages compared to the above-described mechanically (percussively) fired devices.

One of the problems that exist with regard to the photographing of human subjects is the tendency of the retinas in the subjects' eyes to reflect light back onto the photographic film and thus show the pupils of the eyes as being red. To overcome the "red-eye" problem, several means have been employed to space the flashlamps a specified distance from the lens of the camera and thus increase the angle of incidence of the illuminating light rays upon the eyes. It will be understood from the following description that one of the primary features of the present invention is the substantial elimination of "red-eye."

It is believed, therefore, that a multilamp photoflash assembly which employs percussively ignited lamps therein, which utilizes a new and unique mechanically operated actuating assembly for sequentially actuating the striking mechanisms associated with said lamps, and which is capable of substantially preventing "red-eye" would constitute an advancement in the art.

OBJECTS AND SUMMARY OF THE INVENTION

It is therefore a primary object of the present invention to enhance the multilamp photoflash assembly art.

It is a further object of the invention to provide a photoflash assembly which utilizes the aforementioned highly reliable percussively ignited flashlamps.

It is an even further object of the invention to provide an assembly of the nature described wherein the striking mechanisms associated with said percussively ignited flashlamps are actuated by mechanical means.

It is still a further object of the invention to provide an assembly of this type which operates in a simple, facile manner and is relatively inexpensive to manufacture.

It is yet another object of the invention to provide a photoflash assembly of the nature described which is capable of substantially preventing the photographic phenomenon known as "red-eye."

In accordance with one aspect of the invention, there is provided a multilamp photoflash assembly which comprises a housing defining two adjacent regions therein. Within one of these regions is located a plurality of percussively ignitable flashlamps. At least one striking mechanism is associated with each of the lamps and is adapted for firing a lamp upon actuation thereof. To actuate these mechanisms, a rotatable actuator is used, the actuator having a shaft portion which includes thereon a plurality of extending arm members. The arm members sequentially actuate the striking mechanisms which in turn fire the flashlamps during rotation of the actuator within the assembly's housing.

In another embodiment of the invention, flashlamps are located within both of the adjacently oriented regions, and a singular rotatable actuator utilized. In still another embodiment, two actuators are used with each providing the respective striking mechanism actuation in one of the regions of the housing.

DETAILED DESCRIPTION OF THE PREFERRED EMBODIMENT

For a better understanding of the present invention, together with other and further objects, advantages, and capabilities thereof, reference is made to the following disclosure and appended claim in connection with the above-described drawings.

Figure 1:
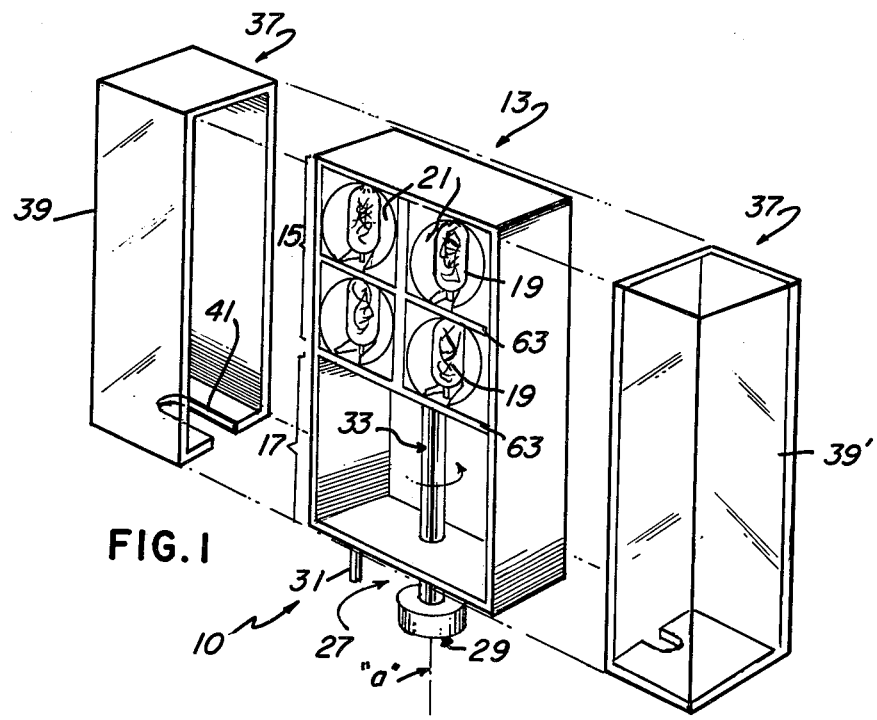
FIG. 1 is an exploded isometric view of a multilamp photoflash assembly in accordance with one embodiment of the invention.

With particular reference to the drawings, there is shown in FIG. 1 a multilamp photoflash assembly 10 in accordance with one embodiment of the invention. Assembly 10 comprises an elongated housing 13 which defines two adjacently oriented regions 15 and 17. First region 15 includes therein a plurality of percussively-ignitable flashlamps 19, an example of one such lamp is shown in U.S. Pat. No. 3,535,063 (Anderson et al.). As explained therein, each lamp includes a primer ignition portion which extends from the glass envelope of the lamp. When struck by an associated striking mechanism, the fulminating material within the primer will deflagrate up through the primer's metal tube and ignite the combustible material within the envelope. This sequence of events is known as "firing" the lamp and results in an actinic illumination of the area in front of the lamp. To enhance this illumination, a reflector 21 is usually positioned relative to each lamp.

As stated, each of the flashlamps utilized in the present invention is of the percussively ignitable variety. Accordingly, each requires at least one striking mechanism 23 (shown in FIG. 2) associated therewith to serve as the impacting or striking means which deforms the primer's metal tube and effects the aforementioned deflagration. The preferred striking mechanisms 23 for use with the present invention each comprise a folded torsional spring 25 somewhat similar to those described in U.S. Pat. No. 3,597,604 (Shaffer). Springs 25 are positioned within first region 15 of assembly 10 relative to lamps 19 in the manner depicted in FIG. 2 and are adapted for firing said lamps when actuated. This actuation is performed in a sequential manner in the instant invention by an elongated, actuating member 27 rotatably positioned within housing 13.

Actuating member 27 includes an end portion 29 which preferably extends from housing 13 relative to and adjacent second region 17 and is adapted for being engaged by an associated drive mechanism (not shown) within the camera body upon which assembly 10 is located. To facilitate positioning of assembly 10 and prevent accidental rotation thereof upon a camera, an external locating stud 31 may be employed. Stud 31 aligns with a corresponding opening (not shown) within the camera.

It is understood from the foregoing description that end portion 29 is rotated by an associated camera mechanism, e.g., gear, in synchronization with the camera's shutter cocking mechanism.

Actuating member 27 further includes a rodlike portion 33 which adjoins end 29 and passes through both regions 15 and 17. Positioned along rodlike portion 33 are a plurality of arm members 35 (one shown in FIG. 2) which extend within first region 15 of housing 13 to actuate the respective striking mechanisms 23 associated with each lamp 19. As will be defined, this actuation is performed in a sequential manner during rotation of actuator 27 within housing 23 to in turn effect sequential actuation of all of the lamps 19 in first region 15.

Assembly 10 is shown in FIG. 1 as further including a transparent cover 37 which comprises two opposing sections 39 and 39'. Sections 39 and 39' serve to completely encapsulate housing 13 and the lamps 19 located therein. A slot 41 is provided within section 39 to accommodate the protruding members 29 and 31.

It is understood with regard to the present invention that one of the regions within the assembly's housing will provide the described spacing sufficient to overcome any "red-eye" problems. In assembly 10 shown in FIG. 1, second region 17 provides this function. With regard to the embodiments shown in FIGS. 4 and 6, which are both invertible upon an associated camera, the region nearest the camera provides the necessary spacing for the adjacent region farthest from the camera and including, therein, the lamps being flashed.

Figure 2:
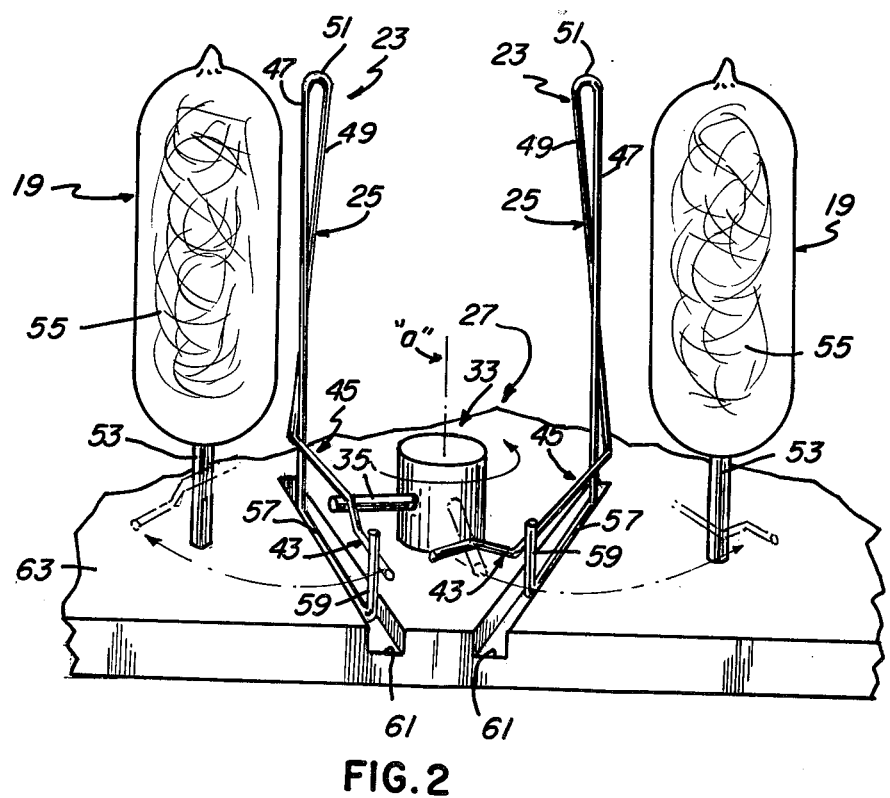
FIG. 2 represents the sequence in steps wherein an adjoining pair of flashlamps of the invention are ignited.

In FIG. 2, an end of rodlike portion 33 of actuator 27 is shown as having one of the extending arm members 35 thereon. In the preferred embodiments of the invention, each arm 35 is adapted for actuating two different lamps 19. Accordingly, for an assembly employing only four lamps within one of the housing's regions, an actuator having two arms 35 would be preferred. In FIG. 2, each of the arms actuates one of the striking mechanisms 23 during rotation of the actuator by engaging an angular cam portion 43 located on the striker arm 45 of spring 25. The springs further include two segments 47 and 49 joined by a common bight 51. Striker portion 45 projects from segment 49 and is adapted for striking the aforementioned primers 53 protruding from the glass envelopes 55 of each lamp 19 when actuated by arm 35. Springs 25 each further include a supporting foot portion 57 which projects from segment 47 and includes a catch 59 at the end thereof. Both supporting foot portions 57 are seated within a provided groove 61 located within a shelf member 63 (also shown in FIG. 1). Each shelf 63 is adapted for having two flashlamps 19 positioned thereon.

Prior to actuation, the striker arm 45 of each spring is maintained in a cooked position via engagement with catch 59. Accordingly, rotation of actuating member 27 causes arm 35 to engage angular cam portion 43 of the first spring (on the left) and force striker 45 up and over the catch. The striker will then impact upon primer 53 and deflagration of lamp 19 will occur. Continued rotation of actuator 27 will cause arm 35 to engage the angular cam portion 43 of striker arm 45 of the second spring (on the right) and force it up and over the respective catch. The above-mentioned sequence of actuation also occurs for the embodiment depicted in FIGS. 4 and 6.

As stated, the preferred number of flashlamps within region 15 is four. It is further preferred in the embodiment of FIG. 1 that all four lamps 19 face in the same direction — that is, all are arranged in such an array so as to illuminate in the same direction when fired.

Figure 3:
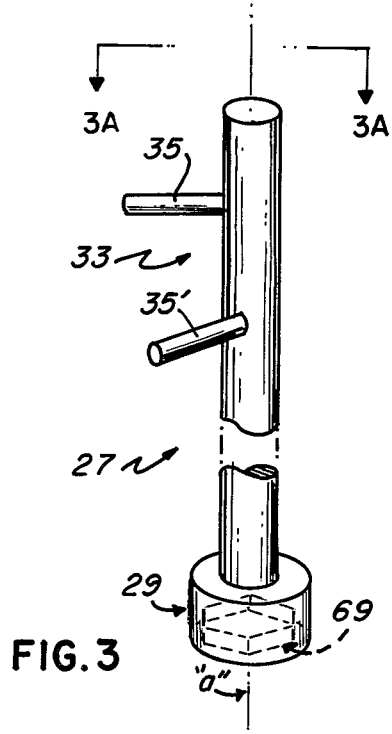
FIG. 3 is an isometric view of the rotatable actuating member for use in the embodiment of FIG. 1.
Figure 3A:
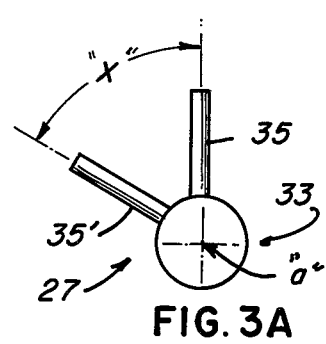
FIG. 3A is a plan view as taken along the line 3A—3A in FIG. 3.

In FIGS. 3 and 3A there is shown the preferred embodiment for the actuating member 27 used in assembly 10. It can be seen that member 27 comprises the described end portion 29, the extending rodlike portion 33, and two extending arm members 35 and 35'. Arms 35 and 35' extend at varying directions from rodlike portion 33 within region 15 and are each adapted for actuating two different pre-energized striking mechanisms 23 located therein. More specifically, each arm 35 or 35', is adapted for triggering two springs 25 positioned on one of the provided shelves 63.

The axis of rotation of actuator 27 is indicated as line "a" in FIGS. 1-3A. Accordingly, the preferred angular displacement for arms 35 and 35' relative to axis "a" is about 60°. This displacement is shown as angle "x" in FIG. 3A.

Figure 4:
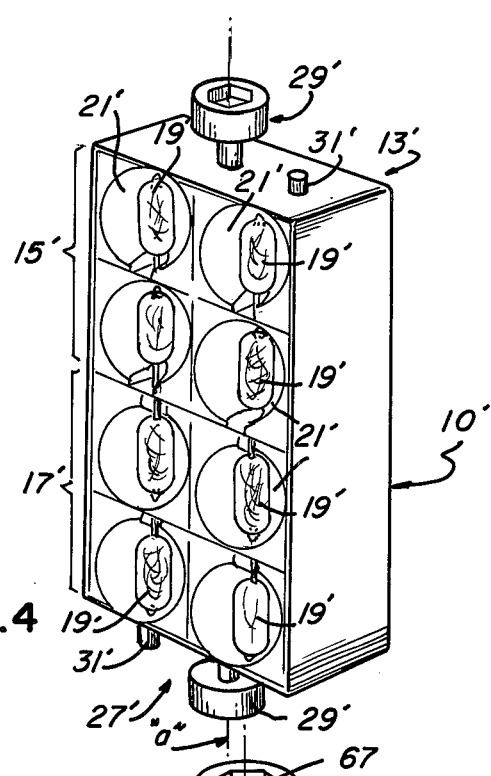
FIG. 4 represents an alternate embodiment of the invention.

In FIG. 4 there is illustrated a multilamp photoflash assembly 10' in accordance with another embodiment of the invention. Substantially similar to assembly 10 of FIG. 1, assembly 10' includes a housing 13' which defines two adjacently oriented regions 15', 17' therein. In assembly 10' however, each of the regions is ', 17' is occupied by a plurality of percussively ignitable flashlamps 19', each having a reflector 21' and a pre-energized striking mechanism (not shown) associated therewith in much the same manner as the corresponding members in assembly 10 (illustrated in FIG. 2). Actuation of the striking mechanisms is accomplished utilizing an elongated actuating member 27' having two opposing end portions 29' and a centrally positioned rodlike portion 33'. For four banks of lamps facing in a similar direction, an actuating member having four extending arms 35, 35', 35", 35"' is preferred and is shown in FIG. 5. Arms 35-35"' extend from rodlike portion 35' in varying directions relative to the axis of rotation of actuator 27' with arms 35, 35' extending within first region 15' and arms 35", 35"' extending within second region 17'. The preferred number of lamps in each region is four, with each arm adapted for actuating two spring mechanisms each associated with one of said lamps. The lower or first end 29' of actuator 27' extends from housing 13' relative to and adjacent second region 17' while the upper or second opposing end extends relative to and adjacent first region 15'.

Figure 5A:
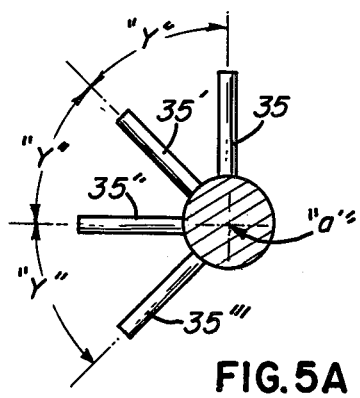
FIG. 5A is a plan view, partly in section, as taken along the line 5A—5A in FIG. 5.
Figure 5:
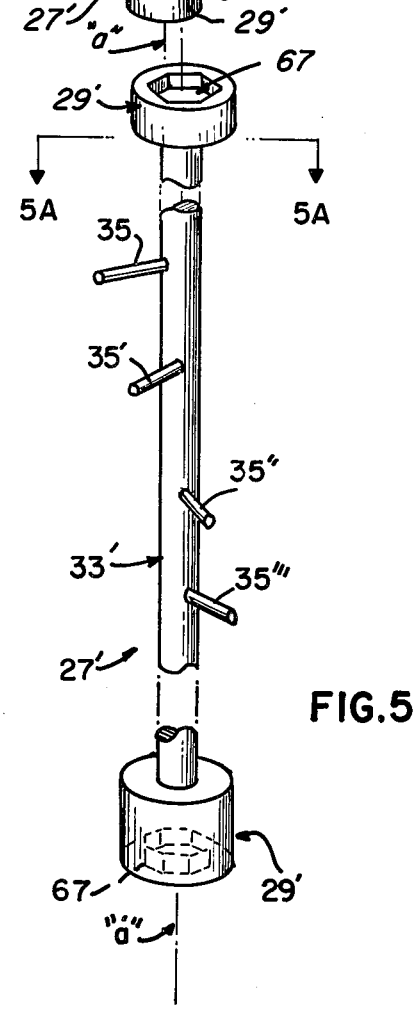
FIG. 5 is an isometric view of the actuating member for use in the photoflash assembly of FIG. 4.

The preferred angular displacements for arms 35-35"' from each other relative to the axis of rotation of member 27' within housing 13' (indicated as "a" in FIGS. 4, 5, and 5A) are shown in FIG. 5A and "y" and are each approximately 45°. This orientation of arm members for a photoflash assembly wherein all of the lamps in both regions face in a singular direction for illumination in said direction upon firing will provide for firing of all of the lamps in one of these regions prior to firing of the lamps in the remaining region. It will thus be necessary to invert the assembly subsequent to firing the lamps in the region farthest from the camera. To facilitate assembly positioning, a pair of locating studs 31' are provided in opposing ends of housing 13'.

Regarding FIG. 5, it should be further noted that arms 35' and 35" are positioned closer to each other on rodlike portion 33' than are the remaining arms. This is due to the preferred positioning of lamps 19' within assembly 10'. It can be seen that the lamps in second region 17' are inverted relative to the lamps in first region 15'. Thus, the respective primers for these lamps are also inverted and spacing requirements dictate that the corresponding striker springs be also inverted for the lamps in this region.

It is preferred to provide each of the end portions 29 with a recess 67 formed to accommodate an octagonally shaped drive member (not shown) which forms part of the camera's shutter-related driving assembly. This facilitates the rotational movement of actuator 27' within housing 13' when assembly 10' is secured atop a camera. For an actuator employing only two arms, e.g., actuator 27 in FIG. 3, it is preferred to provide end 29 with a hexagonal opening 69 to accommodate a corresponding hexagonally shaped drive member.

Figure 6:
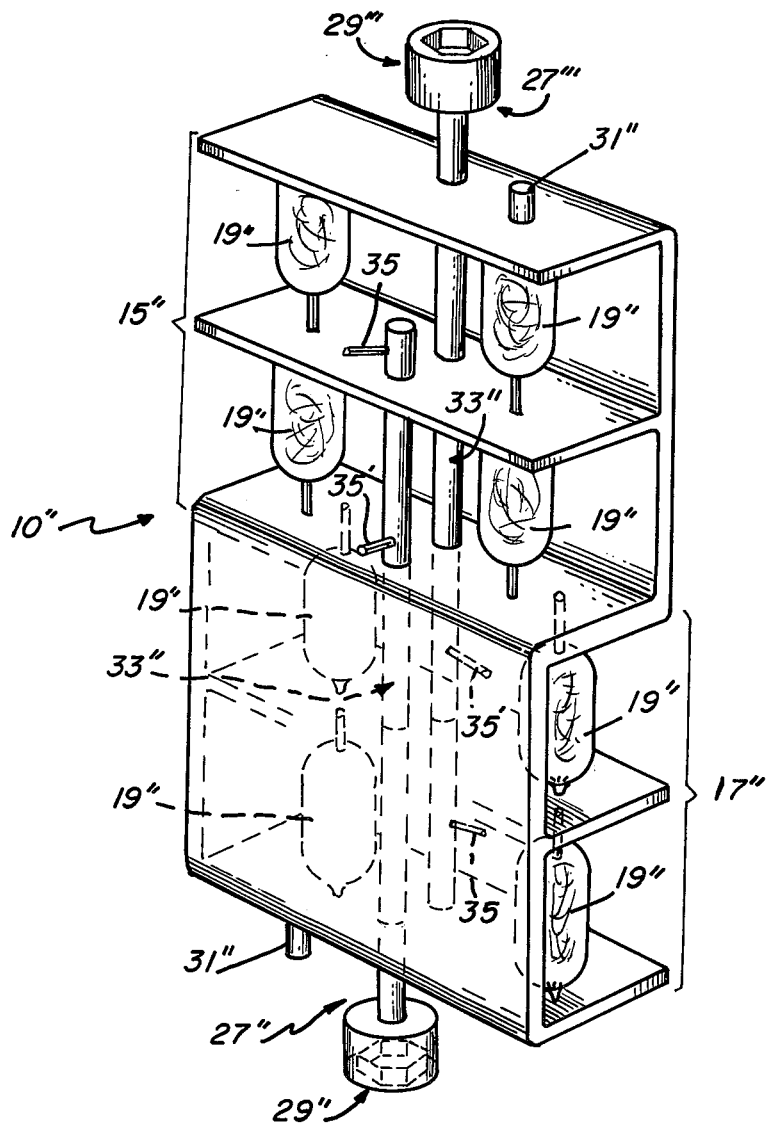
FIG. 6 is an isometric view of a multilamp photoflash assembly in accordance with still another embodiment of the invention.

In FIG. 6 is shown a multilamp photoflash assembly 10" in accordance with still another embodiment of the invention. In assembly 10", however, each of the regions 15" and 17" face in opposing directions and the lamps, preferably four, in each of these regions are thus positioned in an array so as to illuminate in said opposing directions when fired. It is additionally preferred in assembly 10" to utilize first and second elongated actuating members 27" and 27"'. Each actuator includes two extending arm members 35, 35' adapted for actuating the striker springs associated with the respective pairs of lamps 19" in each region. The striker springs, similar in configuration and operation to springs 25 in FIG. 2, are not illustrated in FIG. 6 for purposes of clarity.

Essentially, each of the actuating members 27" and 27"' are substantially similar to the actuator 27 shown in FIGS. 3 and 3A. Accordingly, the two arms positioned on the rodlike portion 33" of each actuator are preferably offset from each other at an angle of 60° relative to the axis of rotation of the actuator within the assembly's housing.

In FIG. 6, actuators 27" and 27"' are shown as being positioned in housing 10" in a substantially opposing relationship. It is further preferred that these members be substantially parallel in said positioning relationship.

Similar to assembly 10' (FIG. 4), assembly 10" is of the invertible type wherein the assembly is re-positioned by inversion after the firing of the lamps within the region most distant from the camera. Thus, the region nearest the camera provides the desired spacing previously mentioned as necessary for substantially preventing "red-eye" problems.

First actuating member 27" has an end portion 29" which preferably extends from the assembly's housing relative to and adjacent second region 17" while second member 27"' has a substantially similar end portion 29"' which extends from the housing relative to and adjacent first region 15". It is also preferred to provide each of these ends with a hexagonally shaped recess to accommodate the camera's drive. Locating studs 31" are also preferably used to assure proper orientation of assembly 10" atop the respective camera.

Thus there has been shown and described a multilamp photoflash assembly which operates in a facile manner, is relatively inexpensive to manufacture, and provides the several advantages inherent in mechanically actuated devices employing percussively ignitable flashlamps.

While there have been shown and described what are at present considered the preferred embodiments of the invention, it will be obvious to those skilled in the art that various changes and modifications may be made therein without departing from the scope of the invention as defined by the appended claims.

What is claimed is:

1. A multilamp photoflash assembly comprising:

an elongated housing defining first and second adjacently oriented regions therein;

a plurality of percussively ignitable flashlamps located within said first region of said housing;

a plurality of pre-energized striking mechanisms positioned within said first region of said housing, each of said striking mechanisms associated with one of said flashlamps for firing said flashlamps upon actuation thereof;

an elongated actuating member rotatably positioned within said housing, said actuating member having an end portion and a rodlike portion adjoining said end portion and passing through said first and second regions, said rodlike portion including a plurality of arm members spacedly positioned therealong and extending within said first region for actuating said pre-energized striking mechanisms in a sequential manner during rotation of said actuating member within said housing.

2. The photoflash assembly according to claim 1 wherein said end portion of said actuating member extends from said housing relative to and adjacent said second region.

3. The photoflash assembly according to claim 1 wherein said arm members spacedly positioned along said rodlike portion extend therefrom in varying directions relative to the axis of rotation of said actuating member within said housing.

4. The photoflash assembly according to claim 3 wherein the number of flashlamps within said first region is four.

5. The photoflash assembly according to claim 4 wherein the number of arm members extending from said rodlike portion is two, each of said arm members adapted for actuating two different of said pre-energized striking mechanisms within said housing.

6. The photoflash assembly according to claim 5 wherein said arm members extend from said rodlike portion at an angle of approximately 60° from each other relative to the axis of rotation of said actuating member within said housing.

7. The photoflash assembly according to claim 4 wherein said four flashlamps are arranged in an array to illuminate in the same direction when fired.

8. The photoflash assembly according to claim 1 wherein each of said striking mechanisms comprises a folded torsional spring including two segments joined by a bight, a striker portion projecting from one of said segments, and a supporting foot portion projecting from the other of said segments and having a catch at the end thereof for engaging said striker portion to maintain said striker portion in a cocked position, said striker portion including an angular cam portion for being engaged by one of said extending arm members of said actuating member to cause said striker portion to disengage said catch.

9. A multilamp photoflash assembly comprising:
an elongated housing defining first and second adjacently oriented regions therein;
a plurality of percussively ignitable flashlamps located within each of said first and second regions of said housing,
a plurality of pre-energized striking mechanisms positioned within each of said first and second regions of said housing, each of said striking mechanisms associated with one of said flashlamps for firing said flashlamps upon actuation thereof; and an elongated actuating member rotatably positioned within said housing, said actuating member having first and second opposing end portions and a central rodlike portion adjoining said end portions and passing through said first and second regions, said rodlike portion including a plurality of arm members spacedly positioned therealong and extending within said first and second regions for actuating said pre-energized striking mechanisms in a sequential manner during rotation of said actuating member within said housing.

10. The photoflash assembly according to claim 9 wherein said first end portion of said actuating member extends from said housing relative to and adjacent said second region and said second portion extends from said housing relative to and adjacent said first region.

11. The photoflash assembly according to claim 9 wherein said arm members spacedly positioned along said rodlike portion extend therefrom in varying directions relative to the axis of rotation of said actuating member within said housing.

12. The photoflash assembly according to claim 11 wherein the number of flashlamps within each of said first and second regions is four.

13. The photoflash assembly according to claim 12 wherein the number of arm members extending from said rodlike portion is four, each of said arm members adapted for actuating two different of said striking mechanisms within said housing.

14. The photoflash assembly according to claim 13 wherein said arm members extend from said rodlike portion at angles of approximately 45° from each other relative to the axis of rotation of said actuating member within said housing.

15. The photoflash assembly according to claim 12 wherein said flashlamps in said first and second regions are arranged in an array to illuminate in the same direction when fired.

16. The photoflash assembly according to claim 9 wherein each of said striking mechanisms comprises a folded torsional spring including two segments joined by a bight, a striker portion projecting from one of said segments, and a supporting foot portion projecting from the other of said segments and having a catch at the end thereof for engaging said striker portion to maintain said striker portion in a cocked position, said striker portion including an angular cam portion for being engaged by one of said extending arm members of said actuating member to cause said striker portion to disengage said catch.

17. A multilamp photoflash assembly comprising:
an elongated housing defining first and second adjacently oriented regions therein;
a plurality of percussively ignitable flashlamps located within each of said first and second regions;
a plurality of pre-energized striking mechanisms positioned within each of said first and second regions of said housing, each of said striking mechanisms associated with one of said flashlamps for firing said flashlamps upon actuation thereof;
a first elongated actuating member rotatably positioned within said housing, said first actuating member having an end portion and a rodlike portion adjoining said end portion and passing through said first and second regions, said rodlike portion including a plurality of arm members spacedly positioned therealong and extending within said first region for actuating said pre-energized striking mechanisms therein in a sequential manner during rotation of said first actuating member within said housing; and a second elongated actuating member rotatably positioned within said housing, said second actuating member having an end portion and a rodlike portion adjoining said end portion and passing through said first and second regions, said rodlike portion including a plurality of arm members spacedly positioned therealong and extending within said second region for actuating said pre-energized striking mechanisms therein in a sequential manner during rotation of said second actuating member within said housing.

18. The photoflash assembly according to claim 17 wherein said end portion of said first actuating member extends from said housing relative to and adjacent said second region and said end portion of said second actuating member extends from said housing relative to and adjacent said first region.

19. The photoflash assembly according to claim 17 wherein said arm members along said rodlike portion of said first actuating member extend therefrom in varying directions relative to the axis of rotation of said first actuating member within said housing and the arm members along said second actuating member extend therefrom in varying directions relative to the axis of rotation of said second actuating member within said housing.

20. The photoflash assembly according to claim 19 wherein the number of flashlamps within each of said first and second regions is four.

21. The photoflash assembly according to claim 20 wherein the number of arm members extending from each of said rodlike portions of said actuating members is two, each of said arm members adapted for actuating two different of said striking mechanisms within said housing.

22. The photoflash assembly according to claim 21 wherein said arm members extend from each of said actuating members at an angle of approximately 60° from each other relative to the axis of rotation of said first and second actuating members, respectively.

23. The photoflash assembly according to claim 20 wherein said four flashlamps in said first region and said four flashlamps in said second region are arranged in opposing arrays to illuminate in opposing directions when fired.

24. The photoflash assembly according to claim 17 wherein said first and second actuating members are positioned within said housing in a substantially parallel relationship.

25. The photoflash assembly according to claim 24 wherein said first and second actuating members are positioned within said housing in a substantially opposing relationship.

26. The photoflash assembly according to claim 17 wherein each of said striking mechanisms comprises a folded torsional spring including two segments joined by a bight, a striker portion projecting from one of said segments, and a supporting foot portion projecting from the other of said segments and having a catch at the end thereof for engaging said striker portion to maintain said striker portion in a cocked position, said striker portion including an angular cam portion for being engaged by one of said extending arm members of said actuating member to cause said striker portion to disengage said catch.

* * * * *